D. H. DU BOSE.
VEHICLE BODY.
APPLICATION FILED DEC. 6, 1916.
1,235,667.
Patented Aug. 7, 1917.
2 SHEETS—SHEET 1.
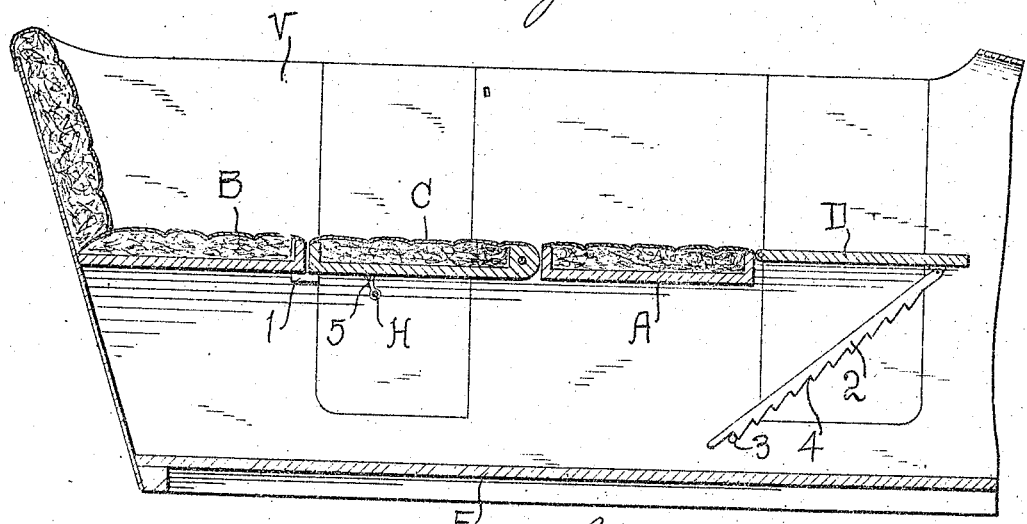
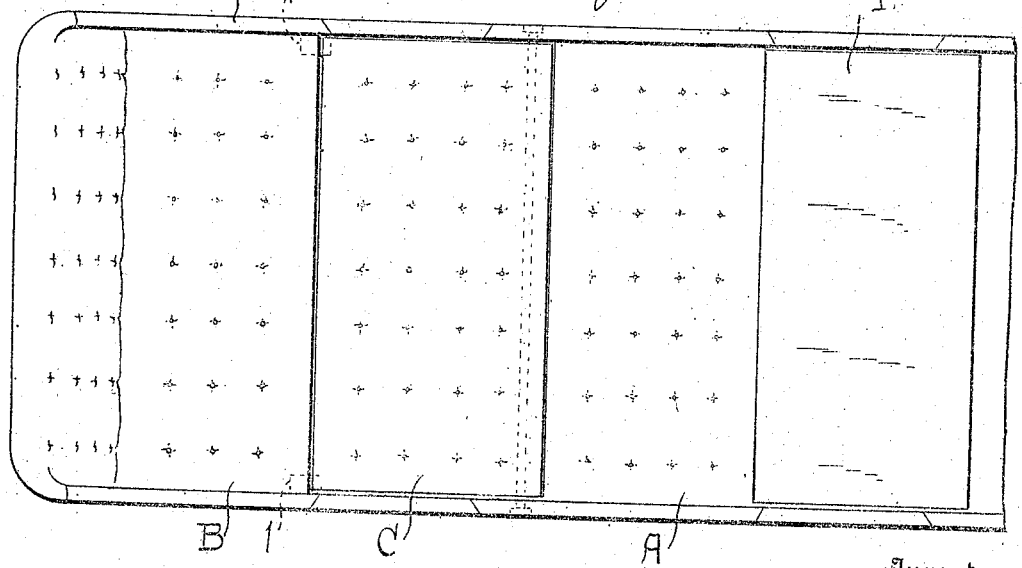
Inventor
D. H. Du Bose
By Watson E. Coleman
Attorney D. H. DU BOSE
VEHICLE BODY.
APPLICATION FILED DEC. 6, 1916.
1,235,667.
Patented Aug. 7, 1917.
2 SHEETS—SHEET 2.
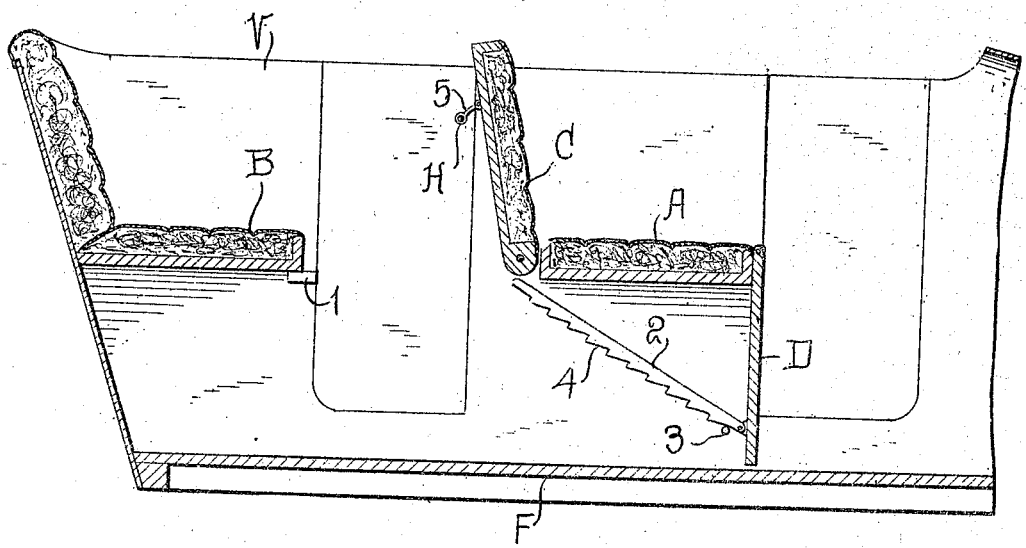
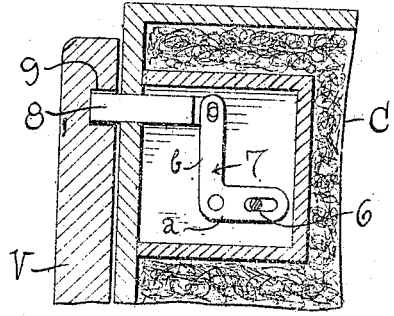
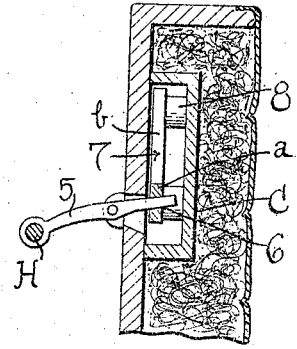
Inventor
D H DuBose
By Watson E. Coleman
Attorney

UNITED STATES PATENT OFFICE.

DANIEL H. DU BOSE, OF GUYMON, OKLAHOMA.

VEHICLE-BODY.

1,235,667.

Specification of Letters Patent.

Patented Aug. 7, 1917.

Application filed December 6, 1916. Serial No. 135,469.

*To all whom it may concern:*

Be it known that I, DANIEL H. DU BOSE, a citizen of the United States, residing at Guymon, in the county of Texas and State of Oklahoma, have invented certain new and useful Improvements in Vehicle-Bodies, of which the following is a specification, reference being had to the accompanying drawings.

This invention relates to certain improvements in vehicle bodies and has relation more particularly to a device of this general character of a type employed in connection with automobiles or similar vehicles; and it is an object of the invention to provide a wagon body having novel and improved means whereby the same may be readily converted for sleeping devices or the like.

The invention also has for an object to provide a novel and improved vehicle body wherein a plurality of seats are employed and wherein one of said seats is provided with a back adjustable relatively to a second seat and whereby said seats may be converted into a bed or the like.

It is also an object of the invention to provide a device of this general character including a seat provided with a swinging back together with novel and improved means whereby said back may be effectively maintained in substantially a vertical position.

Furthermore it is an object of the invention to provide a vehicle including a novel and improved seat structure wherein a swinging panel is employed adapted to be elevated to coact with the bed structure or to permit an effective ventilation of the body beneath the seat and to permit access beneath the seat for the purpose of cleansing or the like.

The invention consists in the details of construction and in the combination and arrangement of the several parts of my improved vehicle body whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein Figure 1 is a vertical sectional view taken through a fragment of a vehicle body illustrating an embodiment of my invention with the back adjusted to a horizontal position to convert the seats into a bed structure;

Fig. 2 is a top plan view of the device as disclosed in Fig. 1;

Fig. 3 is a vertical sectional view taken through a fragment of a vehicle body illustrating the front seat in its normal position;

Fig. 4 is a fragmentary view partly in elevation and partly in section illustrating one of the locking members for maintaining the back of the front seat in its normal position; and Fig. 5 is a transverse sectional view taken through the structure as disclosed in Fig. 4.

As disclosed in the accompanying drawings, A and B denote seats disposed transversely of a vehicle and spaced longitudinally thereof, the forward seat A being provided with a swinging back C which, when lowered into substantially a horizontal position, serves to bridge the space between the seats A and B so that the same may be readily and conveniently employed for sleeping devices or the like. When in its lowered position the back C is adapted to contact with the inwardly disposed stops 1 carried by the opposite side walls of the body V of the vehicle.

Coacting with the front seat A is the swinging panel D which is normally positioned substantially vertical to close the space between the seat A and the floor F of the vehicle body but which, when elevated, permits ready access beneath the seat A for the purposes of cleansing or to permit a circulation of air therebeneath for the purposes of ventilation.

When elevated to substantially a horizontal position the panel D coacts with the seat A in such a manner as to be included in the bed structure and as herein disclosed said panel D is maintained in its elevated position through the medium of the rack or tooth bar 2 pivotally engaged with the lower or outer marginal portion of the panel D and adapted to coact with the pin 3 extending inwardly from a side wall of the body V. In view of the fact that the teeth or notches 4 of the bar 2 are longitudinally spaced the panel D is capable of being maintained at differing angles of elevation as the requirements of practice may dictate.

Disposed longitudinally of the back C adjacent the upper margin thereof is a hanger bar H provided adjacent its opposite ends with the inwardly directed arms 5 pivotally supported intermediate their length by the back C, and each of said arms 5 is operatively engaged, as at 6, with an arm $a$ of a bell crank lever 7, the second arm $b$ of said bell crank lever 7 being operatively engaged with a latch member 8 which, when projected beyond the adjacent side or end of the back C, is adapted to be accommodated within a recess 9 produced in the adjacent side wall of the vehicle body V whereby it will be perceived that the back C is effectively held in its normal or elevated position.

The bar H is adapted to support robes, articles of clothing or the like and also affords a convenient means whereby the locking means for the back C may be readily and conveniently operated.

From the foregoing description, it is thought to be obvious that a vehicle body constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination with a seat structure including side walls, a swinging back, latch members carried by the back adjacent opposite sides thereof and coacting with the end walls of the seat structure for holding the back against swinging movement, bell crank levers coacting with said latch members, and a swinging bar disposed longitudinally of the back and operatively engaged with each of said bell crank levers whereby said latch members may be operated in unison.

In testimony whereof I hereunto affix my signature in the presence of two witnesses.

DANIEL H. DU BOSE.

Witnesses:
BURNIE L. BEVILL,
NANNA R. DU BOSE.